May 3, 1938. F. L. MAIN ET AL 2,115,961
BRAKE MECHANISM
Filed June 15, 1936 3 Sheets-Sheet 1

INVENTORS
FRANK L. MAIN
CHARLES A. SAWTELLE
BY
ATTORNEYS

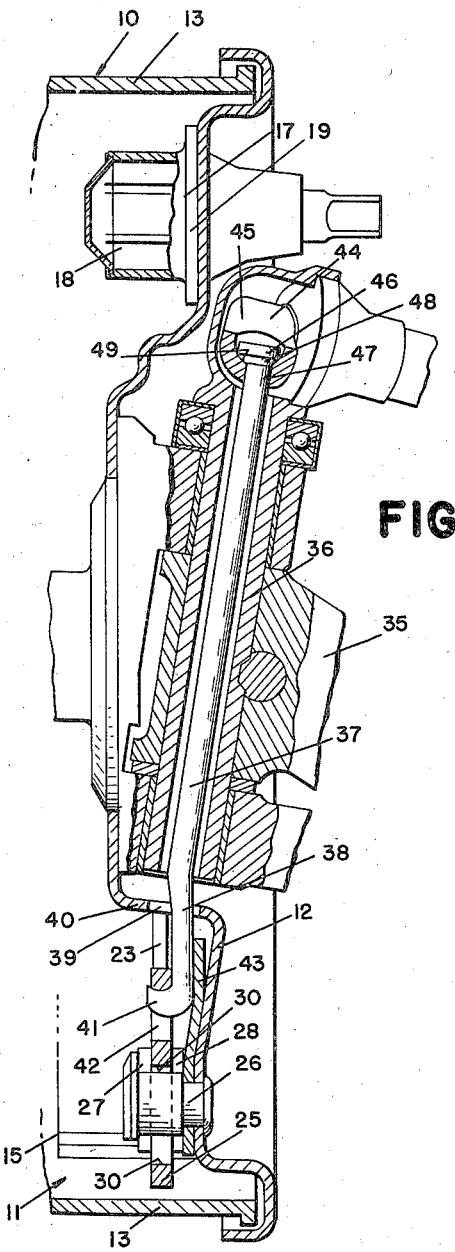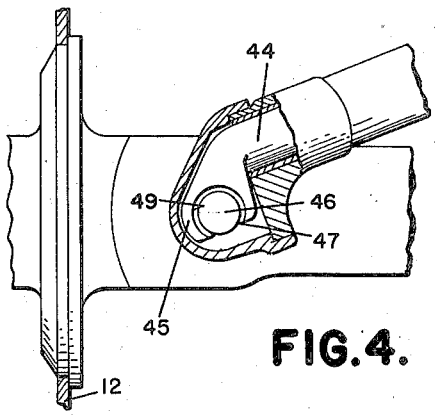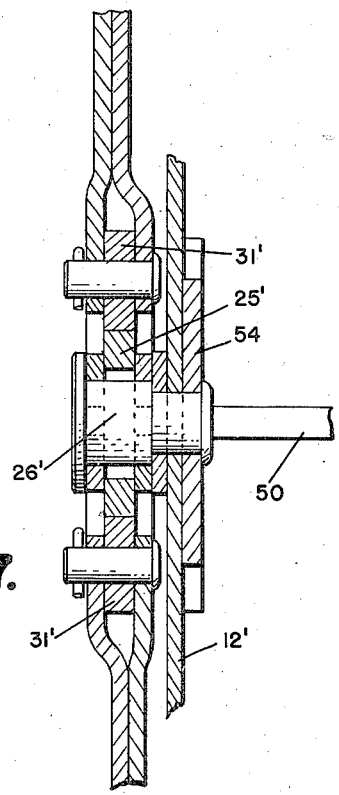

May 3, 1938. F. L. MAIN ET AL 2,115,961
BRAKE MECHANISM
Filed June 15, 1936  3 Sheets-Sheet 3

INVENTORS
FRANK L. MAIN
CHARLES A. SAWTELLE
BY
ATTORNEYS

Patented May 3, 1938

2,115,961

UNITED STATES PATENT OFFICE 2,115,961

BRAKE MECHANISM

Frank L. Main, Birmingham, and Charles A. Sawtelle, Detroit, Mich., assignors to Kelsey-Hayes Wheel Company, Detroit, Mich., a corporation of Delaware Application June 15, 1936, Serial No. 85,396

11 Claims. (Cl. 188—78)

This invention relates generally to brakes and refers more particularly to improvements in shoe brakes.

Heretofore, considerable difficulty has been encountered in providing a shoe brake wherein the maximum area of the friction lining on the shoes is uniformly engaged with the braking surface, irrespective of variations in thermal conditions of brake operation. Under normal brake application, the temperature of the drum rises at a faster rate than the temperature of the shoes, due to the insulation afforded by the brake lining. As a result, the brake flange of the drum expands to a greater extent than the shoes or, in other words, increases in diameter. Thus, when the brake is applied, the central portions of the shoes contact with the brake flange before the end portions, and this decreases the effectiveness of the brake because it reduces the amount of wrap of the shoes. On the other hand, when the temperature of the shoes becomes sufficient to effect expansion of the shoes, the same tend to straighten out, and such action increases the pressure of engagement of the end portions of the shoes with the drum and tends to relieve the pressure of engagement of the central portions of the shoes with the drum. This arrangement is likewise objectionable in that it has the tendency of providing too much wrap and oftentimes results in grabbing of the brake.

It is, therefore, one of the principal objects of this invention to overcome the foregoing objections by providing a brake having shoes constructed to compensate for the inefficiencies resulting from variations in the thermal conditions of the brake. In accordance with this invention, the brake shoes are provided with reduced web sections near the ends thereof so that when the pressure at the central portions of the shoes is greater, due to expansion of the brake flange relative to the shoes, the end portions will expand and increase the amount of friction lining in contact with the brake flange. This construction of shoe also takes care of the second condition, mentioned above, in that when the pressure at the end portions of the shoes is greater than the pressure at the central portion, the said end portions will move inwardly sufficiently to permit the central portions to contact with the brake flange. Thus, it will be noted that uniform engagement of the friction lining with the brake flange is rendered possible irrespective of thermal conditions, and smooth deceleration is insured.

Another object of this invention is to provide actuating means for the shoes rendering it possible to eliminate the objectionable snap or grab so often present in shoe brakes, and to appreciably increase the braking effectiveness of the secondary shoe. In accordance with this invention, the foregoing is accomplished by actuating means effective to move the anchor end of the primary shoe into engagement with the drum before the remaining portion of the shoe is brought into engagement with the drum so as to cause the shoe to wrap into engagement with the drum in a direction opposite the direction of rotation of the drum, and to lift the secondary shoe toward the drum to engage the anchor end of the secondary shoe with the drum prior to engagement of any other part of the latter shoe with the drum, so as to cause the shoe to wrap into engagement with the drum in the direction of rotation of the latter.

The foregoing, as well as other objects, will be made more apparent as this description proceeds, especially when considered in connection with the accompanying drawings, wherein:

Figure 3 is a sectional view taken substantially on the plane indicated by the line 3—3 of Figure 1;

Figure 4 is a fragmentary plan view partly in section of the construction shown in Figure 3;

Figure 7 is a sectional view taken substantially on the plane indicated by the line 7—7 of Figure 5.

Figures 1, 2:
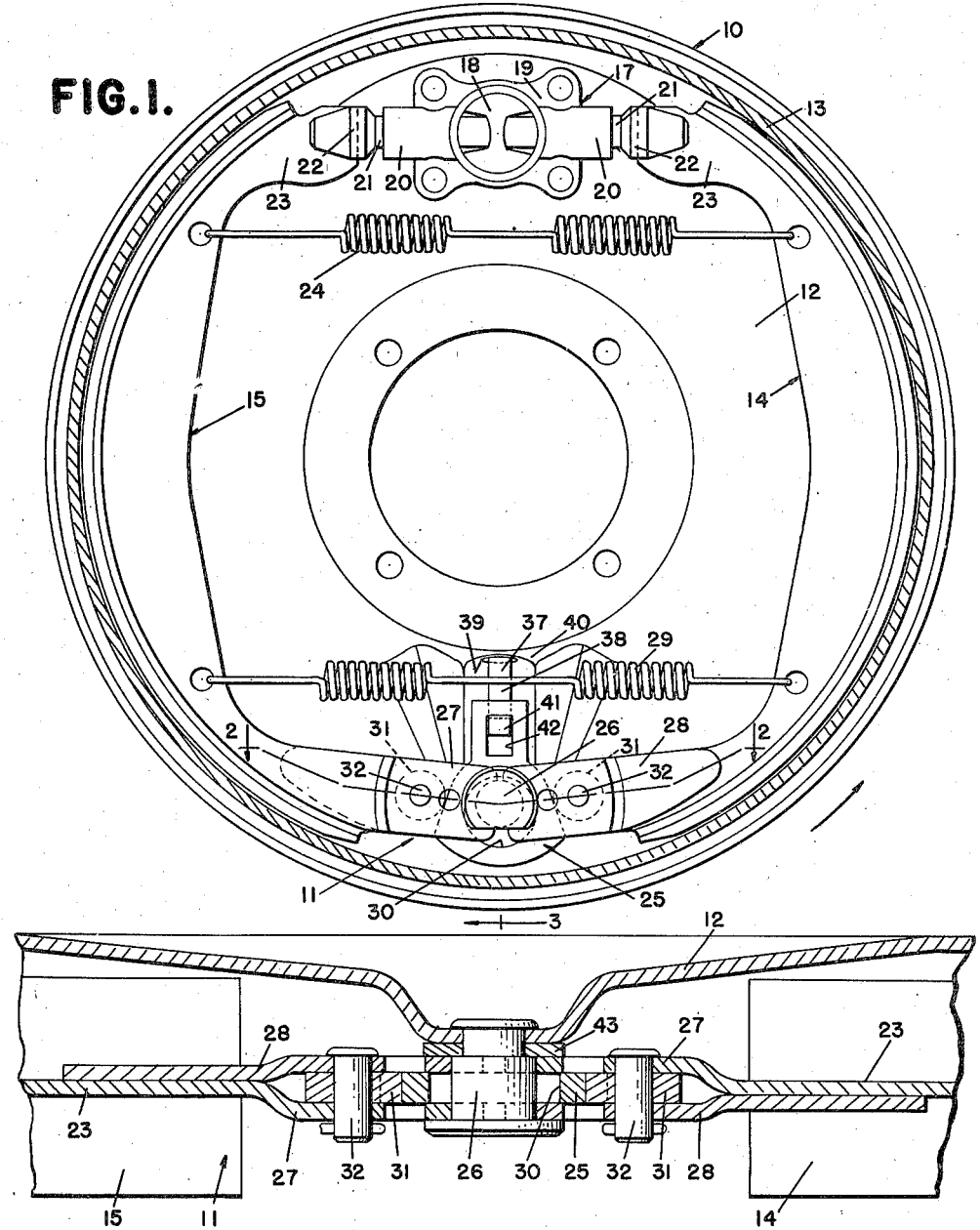
Figure 1 is a front elevational view partly in section of brake mechanism constructed in accordance with this invention.
Figure 2 is a sectional view taken substantially on the plane indicated by the line 2—2 of Figure 1.

Upon reference to Figure 1 of the drawings, it will be noted that the brake illustrated in this figure comprises a brake drum 10 and brake mechanism 11 supported within the drum on a backing plate 12 adapted to close the rear side of the drum. In accordance with conventional practice, the brake mechanism 11 is provided with friction means located in the drum for engagement with the inner annular surface of the brake flange 13 of the drum, and in the present instance, comprises two shoes 14 and 15. Assuming that the drum is rotated in the direction of the arrow in Figure 1, the shoe 14 is the primary shoe, and the shoe 15 is the secondary shoe. Both of the above shoes are T-shaped in cross section and the opposite ends thereof are spaced from each other circumferentially of the drum. Secured to the backing plate 12 of the brake drum between the upper ends of the two shoes, is an adjustment anchor device 17 operable to compensate for wear of the friction surfaces of the shoes by varying the clearance between the latter surfaces and the brake flange 13 of the drum. In the present instance, the adjustment anchor device comprises a wedge 18 supported for adjustment axially of the drum within a bracket 19 secured to the backing plate 12 and having tubular guiding portions 20 for receiving the adjustment links 21. The inner ends of the adjustment links are adapted to engage the inclined surfaces of the wedge, while the outer ends of the links are provided with heads 22 having bifurcated extremities for loosely receiving, between the furcations thereof, the upper ends of the web portions 23 of the brake shoes. It will be noted from Figure 1, that the upper ends of the web portions 23 extend beyond the head portions of the shoes and the free edges thereof, are urged into engagement with the portions of the heads 22 between the furcations by means of the retraction spring 24 interconnecting the two shoes between the adjustment anchor device and axis of rotation of the drum.

The actuating means for moving the shoes outwardly into engagement with the brake flange 13 is located between the lower ends of the brake shoes and comprises a wedge 25 supported on the backing plate 12 for radially inward movement relative to the lower ends of the brake shoes. The wedge 25 is loosely mounted upon a shouldered pin 26 permanently secured to the backing plate 12 and forming an abutment for the lower ends of the brake shoes. Upon reference to Figure 2, it will be noted that the lower ends 27 of the web portions 23 of the T-shaped shoes extend beyond the head portions of the shoes and are offset axially of the drum. It will also be observed from Figure 2 that suitable plates 28 are welded or otherwise suitably secured to the sides of the webs 23 with the lower extremities spaced axially from the offset portions 27 to receive the wedge 25 therebetween. The lower edges of the offset portions 27 of the webs 23 and the corresponding edges of the plates 28 are recessed to partially receive opposite sides of the shouldered pin 26. These edges are normally maintained into engagement with opposite sides of the shouldered pin 26 by means of a retraction spring 29 interconnecting the shoes between the wedge 25 and the axis of rotation of the drum.

Although the wedge 25 is held between the lower extensions of the shoes from axial displacement relative thereto, nevertheless, the wedge is mounted for shifting movement in a plane parallel to the plane of rotation of the brake drum. As shown in Figures 1 to 3, inclusive, of the drawings, the wedge 25 is formed with an enlarged opening 30 therethrough for receiving the shouldered pin 26, and this opening is of sufficient dimension to not only provide the desired circumferential shifting movement of the wedge, but to also permit the extent of radial movement of the wedge required to expand the shoes into frictional engagement with the brake flange 13. In this connection, it will be noted that the opposite sides of the wedge 25 are inclined inwardly toward the axis of rotation of the drum and are adapted to engage suitable rollers 31 supported upon the pins 32 between the bifurcated lower extremities of the brake shoes.

In actual practice, the brake mechanism, forming the subject matter of this invention, is so constructed that the friction at the actuator end is greater than the friction at the adjustment end, so as to insure movement of the anchor ends of the shoes into engagement with the brake flange 13 before any other part of the shoes are brought into engagement with said flange. In other words, the present construction is such that upon radial inward movement of the wedge 25, the primary shoe 14 is caused to move into engagement with the brake flange of the drum in a direction opposite the direction of rotation of the drum, and the secondary shoe is caused to wrap into engagement with the brake flange 13 of the drum in the direction of rotation of the latter. It has been found that an arrangement of the above type develops approximately 40% more torque for the same pedal pressure, and that the ratio of wear between the primary and secondary shoe is approximately 2 to 1, as compared with a 4 to 1 ratio in brakes employing other types of actuating means, such as an outwardly movable wedge. It necessarily follows from the above, that with the present invention, the effectiveness of the secondary shoe is greatly increased, and that softer more uniform braking may be realized.

With reference to the remarks noted in the preceding paragraph, attention is called to Figure 1, wherein it will be noted that the retraction springs for the brake shoes tend to resist spreading of the actuator ends of the shoes to a greater extent than the anchor or adjustment ends of the shoes. In other words, the retraction spring 29 directly resists spreading of the lower ends of the shoes by the wedge 25, while the retraction spring 24 tends to assist shifting of the shoes toward the adjustment anchor device to bring the adjacent ends of the shoes into engagement with the brake flange 13.

In Figure 3 of the drawings, we have shown means for moving the wedge 25 radially inwardly when the brake is associated with a dirigible vehicle wheel. As shown in Figure 3, the brake drum 10 is mounted upon one end of the axle 35 for swivel movement about the axis of the kingpin 36, and the latter is tubular in cross section to provide for extending a rod 37 therethrough. As is usually the case, the axis of the kingpin is inclined with respect to rotation of the brake drum, and in the present instance, the end 38 of the rod extends below the corresponding end of the kingpin. As shown in Figure 3, the end 38 of the rod extends into the drum through an opening 39 formed in the axially extending portion 40 of the backing plate 12, and is offset from the body portion of the rod to lie in a plane parallel to the plane of movement of the wedge 25. The extremity of the end 38 is provided with a hook 41 adapted to extend through an opening 42 in an upwardly extending portion of the wedge 25 for engagement with the radially inner wall of the opening 42. The hook 41 is maintained in engagement with the wedge and the end 38 is guided by means of a plate 43 secured to the backing plate 12 by the shouldered pin 26 and engaging the rear side of the end 38 of the rod. With the above construction, it will be noted that displacement of the rod 37 in an upward direction on the axis of the kingpin 36 effects a radially inward movement of the wedge 25 to spread or expand the brake shoes into engagement with the brake flange 13 in the manner previously described.

In the present instance, the rod 37 is actuated by means of a rockshaft 44 journalled at the upper end of the kingpin for rocking movement about an axis transverse to the axis of the kingpin and having a crank 45 at the forward end thereof engaging the upper end of the rod 37 beneath the enlarged head 46 formed on said end. As shown in Figure 4, the portion of the rod adjacent the head 46 is adapted to be inserted in a slot 47 formed in the end of the crank, and the shoulder 48 on the rod 37, formed by the head 46, is adapted to engage a spherical shaped seat 49 on the crank to permit rocking movement of the rod 37 about the axis of the kingpin when the brake drum is turned relative to the latter.

Figure 5:
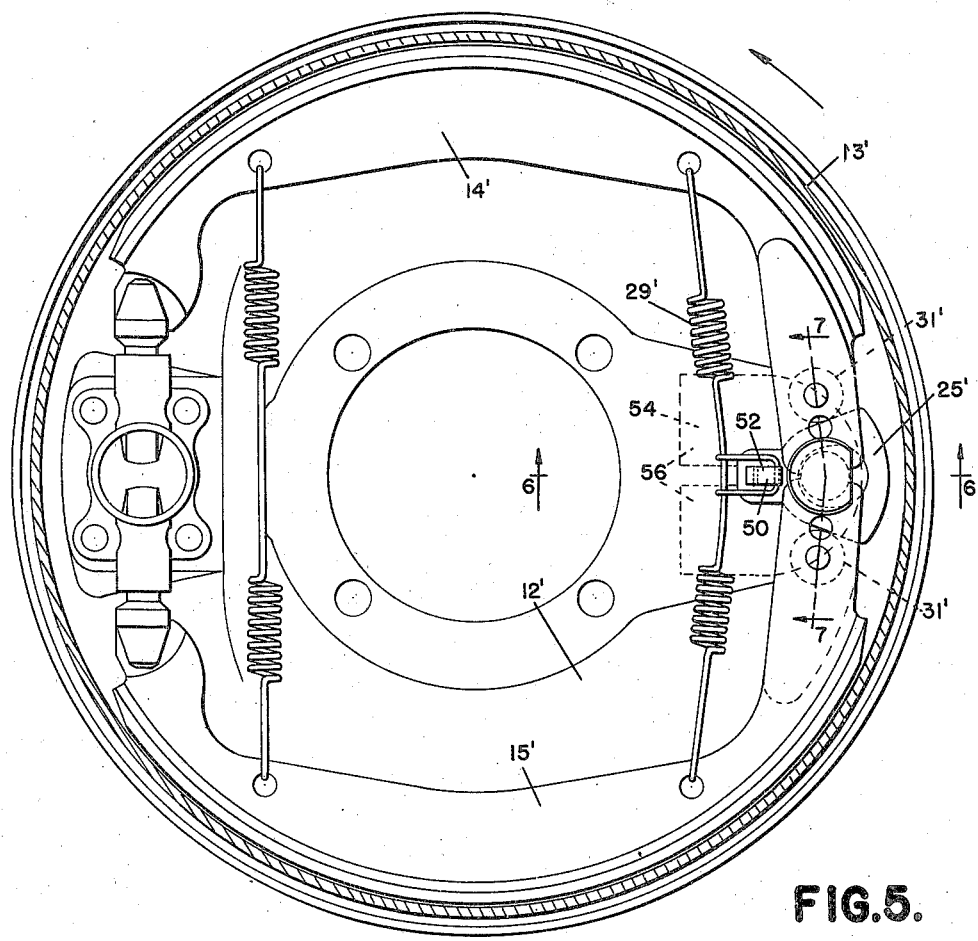
Figure 5 is a front elevational view partly in section of a slightly modified form of brake construction.
Figure 6:
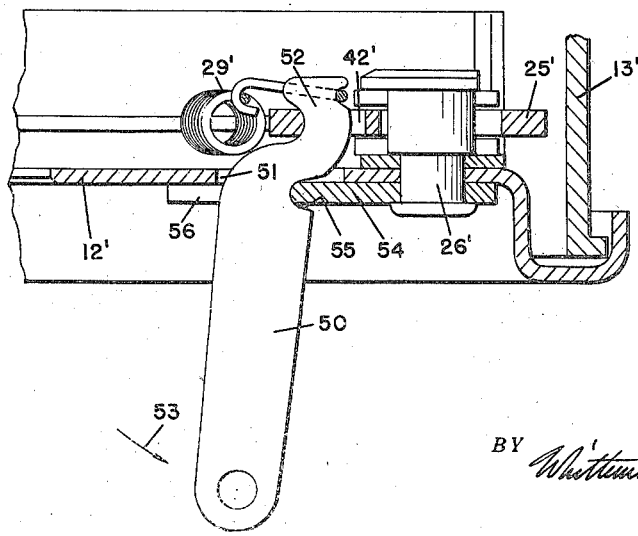
Figure 6 is a cross sectional view taken substantially on the plane indicated by the line 6—6 of Figure 5.

The embodiment of the invention shown in Figures 5 to 7, inclusive, differs from the one previously described in the means for moving the wedge 25' radially inwardly to expand the shoes 14' and 15' into engagement with the brake flange 13' of the drum. Upon reference to Figure 6, it will be noted that the wedge 25' is moved radially inwardly by a lever 50 extending axially of the brake drum and having the forward end projecting into the drum through a slot 51 formed in the backing plate 12'. The forward end of the lever is provided with an outwardly offset hook portion 52 extending through the opening 42' in the wedge 25' and engageable with the radially inner edge of the opening to move the wedge 25' inwardly upon rocking movement of the lever in the direction of the arrow 53. The lever 50 is shown in Figure 6 as fulcrumed upon a plate 54 secured to the rear side of the backing plate 12' by means of the shouldered pin 26', and for this purpose, the rear edge of the former is recessed, as at 55, to receive the radially inner edge of the plate 54. It will be observed from Figure 5 that lateral displacement of the lever 50 is prevented by inwardly projecting extensions 56 on the plate 54, and that the lever is maintained into frictional engagement with the fulcrum by means of the retraction spring 29'. In this connection, the retraction spring 29' is tensioned by hooking the intermediate portion thereof over the end of the lever projecting forwardly from the wedge 25', in such a manner that the spring normally urges the hooked portion 52 of the lever into engagement with the radially outer edge of the opening 42', through the wedge 25'. This arrangement also maintains the oppositely inclined sides of the wedge 25' into engagement with the rollers 31' and thereby eliminates any lost motion in the actuating mechanism. With the above exceptions, the embodiment of the invention shown in Figures 5 to 7, inclusive, is the same in construction and operation as the first described form of this invention.

What we claim as our invention is:

1. In a brake mechanism, a brake drum, brake shoes supported within said drum for engagement therewith and having spaced ends, anchorage means associated with the ends of the shoes at one side of the drum and permitting radially outward movement of said ends, and means engageable with the other ends of the shoes for expanding said shoes into engagement with the drum, said means comprising a radially inwardly movable wedge supported between said other ends of the shoes for shifting movement both circumferentially and radially relative to the drum and effective to move the anchor ends of the shoes into engagement with the drum before any other part of the shoes are engaged with said drum.

2. In a brake mechanism, a brake drum, brake shoes supported within said drum for engagement therewith and having spaced ends, anchorage means associated with the ends of the shoes at one side of the drum and permitting outward displacement of said ends, a retraction spring interconnecting the anchor ends of the shoes, a second retraction spring interconnecting the other end portions of the shoes, and means interposed between said other end portions of the shoes for engagement therewith to expand the shoes into engagement with the drum, said last named means comprising a radially inwardly movable wedge supported for both radial and circumferential shifting movement relative to the drum and cooperating with the retraction springs to effect movement of the anchor ends of the shoes into engagement with the drum before any other part of the shoes are engaged with said drum.

3. In a brake mechanism, a brake drum, brake shoes supported within said drum for engagement therewith and having spaced ends, anchorage means associated with the ends of the shoes at one side of the drum and permitting outward shifting movement of said ends, means engageable with the other ends of the shoes for expanding the shoes into engagement with the drum, said last named means comprising a radially inwardly movable wedge supported for shifting movement relative to the drum and effective to cause the primary shoe to wrap into engagement with the drum in a direction opposite the direction of rotation of the drum and to wrap the secondary shoe into engagement with the drum in the direction of rotation of said drum, and means for moving said wedge radially inwardly.

4. In a brake mechanism, a brake drum, brake shoes supported within said drum for engagement therewith and having spaced ends, an adjustment anchor device interposed between the ends of the shoes at one side of the drum and permitting outward shifting movement of said ends, and means engageable with the other ends of the shoes for expanding said shoes into engagement with the drum, said last named means comprising an actuator supported for shifting movement relative to the drum and effective to cause the primary shoe to wrap into engagement with the drum opposite the direction of rotation of the drum and to cause the secondary shoe to wrap into engagement with the drum in the direction of rotation of said drum.

5. In a brake mechanism for a vehicle wheel, a brake drum, a backing plate for the drum, brake friction means within and engageable with said drum, a radially inwardly movable wedge located within the drum and engageable with the friction means for actuating the same, and a rod supported exteriorly of the backing plate for longitudinal movement in a plane extending at an angle to the plane of rotation of the drum and having one end extending through the backing plate into the drum, said end of the rod being offset to lie in a plane parallel to the plane of rotation of the wheel and engageable with the wedge.

6. In a brake mechanism for a vehicle wheel, a brake drum, a backing plate for the drum, brake friction means supported within said drum for engagement therewith, a wedge movable radially inwardly in a plane substantially parallel to the plane of rotation of the drum for actuating the brake friction means, a rod supported exteriorly of the backing plate for longitudinal movement at an angle to the plane of movement of the wedge and having one end extending through the backing plate into the drum, said end being offset to lie in a plane parallel to the plane of movement of the wedge and connected to the latter, and means for longitudinally moving said rod.

7. In a brake mechanism, a brake drum, a backing plate for the drum, brake friction means supported within the drum for engagement therewith, a radially inwardly movable wedge located within the drum for engagement with the brake friction means to move the latter into engagement with said drum, and a lever extending through the backing plate into the drum and having a hooked portion on the end thereof in the drum extending through an opening in said wedge.

8. In a brake mechanism, a brake drum, a backing plate for the brake drum having an opening therethrough, brake shoes supported within said drum for engagement therewith, a radially inwardly movable wedge engageable with adjacent ends of the shoes for expanding the same into engagement with the drum, a retraction spring interconnecting the shoes adjacent the wedge, and a lever fulcrumed on a part carried by the backing plate and having one end extending through the opening in the backing plate, said end having a portion extending through an opening in the wedge to the front side of the latter and normally urged into engagement with the radially inner edge of said opening through the wedge by the retraction spring.

9. In a brake mechanism, a brake drum, a backing plate for the brake drum, brake shoes supported within the drum for engagement therewith, a radially inwardly movable wedge located between adjacent ends of the shoes for engagement therewith to expand said shoes into engagement with the drum, means for moving the wedge radially inwardly including a lever fulcrumed on the backing plate and having one end extending through the backing plate into the drum, said end also extending through an opening in the wedge, and a retraction spring interconnecting the end portions of the shoes adjacent the wedge and cooperating with said end of the lever to maintain the wedge in engagement with said ends of the shoes.

10. In a brake mechanism for a vehicle wheel, a brake drum, a backing plate for the drum, brake friction means within said drum and having spaced ends, a radially inwardly movable wedge located within the drum and engageable with the ends of the friction means for moving the friction means into engagement with the drum, a member supported exteriorly of the backing plate for longitudinal movement in a plane extending at an angle to the plane of rotation of the drum and having one end extending through the backing plate into the drum, said end of the member being offset to lie in a plane substantially parallel to the plane of movement of said wedge and having a portion engageable with the wedge, and means carried by the backing plate and engageable with the end aforesaid of the member for guiding the latter.

11. In a brake mechanism for a vehicle wheel, a brake drum, a backing plate for the drum, brake friction means within said drum and having spaced ends, a radially inwardly movable wedge supported between the ends of the friction means for shifting movement relative to the drum and engageable with said ends of the friction means for actuating the latter, and a rod supported exteriorly of the backing plate for longitudinal movement in a plane extending at an angle to the plane of rotation of the drum and having one end extending through the backing plate into the drum, said end of the rod being offset to lie in a plane parallel to the plane of rotation of the wheel and having a hooked portion extending through an enlarged opening in a portion of the wedge for engagement with the radially inner side of the opening to actuate the wedge.

FRANK L. MAIN.
CHARLES A. SAWTELLE.